(12) United States Patent
Haynes

(10) Patent No.: US 10,053,941 B2
(45) Date of Patent: Aug. 21, 2018

(54) METAL ENCAPSULATED COMPOSITE SEAL

(71) Applicant: Cameron International Corporation, Houston, TX (US)

(72) Inventor: Brian Haynes, West Yorkshire (GB)

(73) Assignee: ONESUBSEA IP UK LIMITED, London (GB)

( * ) Notice: Subject to any disclaimer, the term of this patent is extended or adjusted under 35 U.S.C. 154(b) by 784 days.

(21) Appl. No.: 13/975,317

(22) Filed: Aug. 24, 2013

(65) Prior Publication Data

US 2014/0054861 A1 Feb. 27, 2014

Related U.S. Application Data

(63) Continuation of application No. 12/525,295, filed as application No. PCT/US2008/051726 on Jan. 22, 2008.

(60) Provisional application No. 60/893,834, filed on Mar. 8, 2007.

(51) Int. Cl.
| F16J 15/32 | (2016.01) |
| E21B 33/03 | (2006.01) |
| F16J 15/12 | (2006.01) |
| E21B 33/00 | (2006.01) |

(52) U.S. Cl.
CPC ............ *E21B 33/03* (2013.01); *F16J 15/128* (2013.01); *E21B 2033/005* (2013.01); *Y10T 29/49993* (2015.01)

(58) Field of Classification Search
CPC .. F16J 15/123; F16J 15/22; F16J 15/28; F16J 15/127; F16J 15/064; F16J 15/104; F16J 15/128; F16J 15/022
See application file for complete search history.

(56) References Cited

U.S. PATENT DOCUMENTS

| 859,813 | A | | 7/1907 | Hartman | |
| 1,635,482 | A | | 7/1927 | Bryan | |
| 1,646,356 | A | * | 10/1927 | Johnson | 264/267 |
| 1,721,155 | A | | 7/1929 | Johnson | |
| 2,967,805 | A | | 1/1961 | Forestek | |
| 3,660,192 | A | * | 5/1972 | Smith et al. | 156/155 |
| 3,918,726 | A | | 11/1975 | Kramer | |
| 3,951,418 | A | | 4/1976 | Dryer | |
| 5,251,917 | A | | 10/1993 | Chee et al. | |
| 5,252,365 | A | | 10/1993 | White | |

(Continued)

FOREIGN PATENT DOCUMENTS

| JP | 01115063 | 8/1989 |
| JP | 07224943 | 8/1995 |
| JP | 08219291 | 8/1996 |

OTHER PUBLICATIONS

PCT International Search Report and Written Opinion for PCT/US2008/051726, dated Jun. 5, 2008.

*Primary Examiner* — Gilbert Y Lee

(74) *Attorney, Agent, or Firm* — Fletcher Yoder, P.C.

(57) ABSTRACT

A system, in certain embodiments, has a composite seal with both a metal shell and an elastic core, such as an elastomer core. In one embodiment, the composite seal has an annular metal shell with a top, a bottom, and a seal interface disposed between the top and the bottom. The composite seal also has an elastomer disposed within the annular metal shell, wherein the elastomer is configured to impart pressure against the seal interface.

20 Claims, 5 Drawing Sheets

(56) References Cited

U.S. PATENT DOCUMENTS

| | | |
|---|---|---|
| 5,580,068 A | 12/1996 | Gundy |
| 5,615,896 A | 4/1997 | Morvant |
| 5,997,003 A | 12/1999 | Turner |
| 6,041,858 A | 3/2000 | Arizmendi |
| 2003/0209857 A1 | 11/2003 | Keene |
| 2003/0209861 A1 | 11/2003 | Keene et al. |
| 2003/0209862 A1 | 11/2003 | Keene et al. |
| 2006/0061047 A1 | 3/2006 | Mulally |

\* cited by examiner

METAL ENCAPSULATED COMPOSITE SEAL

CROSS REFERENCE TO RELATED APPLICATIONS

This application claims priority to and benefit of U.S. Non-Provisional patent application Ser. No. 12/525,295, entitled "Metal Encapsulated Composite Seal", filed on Jul. 30, 2009, which is herein incorporated by reference in its entirety, and which claims priority to and benefit of PCT Patent Application No. PCT/US2008/051726, entitled "Metal Encapsulated Composite Seal", filed on Jan. 22, 2008, which is herein incorporated by reference in its entirety, and which claims priority to and benefit of U.S. Provisional Patent Application No. 60/893,834, entitled "Metal Encapsulated Composite Seal", filed on Mar. 8, 2007, which is herein incorporated by reference in its entirety.

FIELD OF THE INVENTION

The present invention relates generally to seals within a fluid system. More particularly, the present invention relates to a novel composite seal suitable for harsh environments, high pressures, and long life in a wellhead.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fluid systems, such as oil and gas extraction and transport systems, typically include multiple segments of tubing, valves, and connectors that are sealed together by various seals. These seals are often subjected to harsh environmental conditions, such as corrosive fluids, extreme pressures, and extreme temperatures. Moreover, seals are often disposed in remote equipment, such as a marine wellhead, which can make access and repair difficult and expensive. In wellhead applications, seals are typically constructed entirely of a metal or entirely of an elastomer. Metal seals provide long term resistance to well bore fluids, but often rely on high installation forces and complicated design and geometry to provide reliable sealing. Elastomer seals typically have a simple design that can be installed with low installation forces, and elastomer seals rely on the behavior of the elastomer (Poisson ratio effect) to provide pressure energization to create the seal. However, elastomer seals have a lesser resistance to well bore fluids in comparison to metal seals.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A system, in certain embodiments, has a composite seal with both a metal shell and an elastic core, such as an elastomer core. In one embodiment, the composite seal has an annular metal shell with a top, a bottom, and a seal interface disposed between the top and the bottom. The composite seal also has an elastomer disposed within the annular metal shell, wherein the elastomer is configured to impart pressure against the seal interface.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
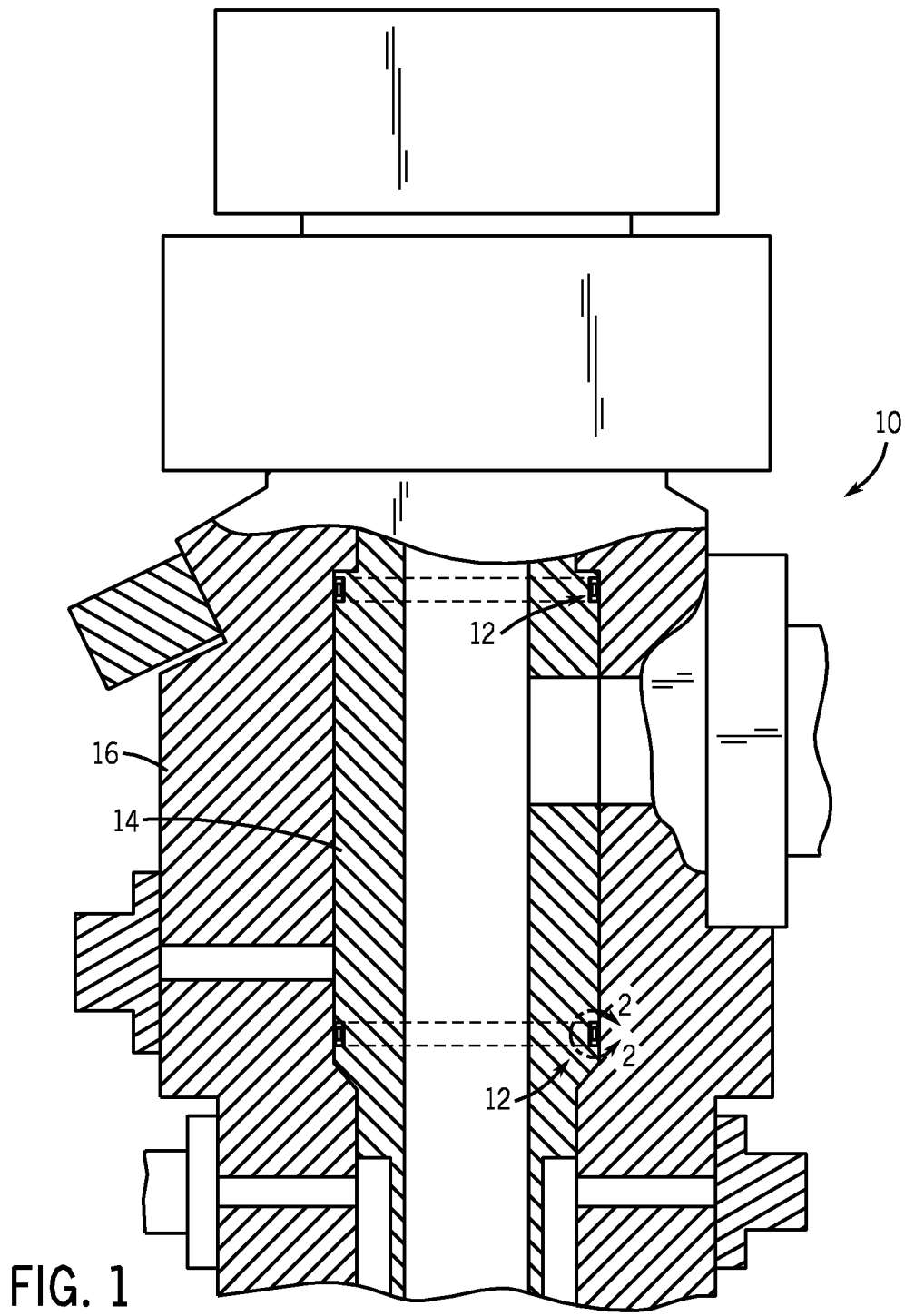
FIG. 1 is a diagram of an exemplary fluid system, such as a wellhead, having a composite seal disposed between various tubing.

FIG. 1 is a partial cross-sectional view of an embodiment of a fluid system 10 having one or more metal encapsulated composite seals 12 disposed between inner and outer tubes 14 and 16. In the case of oil and gas production, such tubes may be any number of tubular components, such as casing strings, tubing strings, tubing heads, casing heads, wellheads, among many others. In certain embodiments, the fluid system 10 is a wellhead for extraction of subterranean natural resources, such as oil and gas. For example, the fluid system 10 may be a surface wellhead or a marine wellhead disposed in a subsea environment. As discussed in further detail below, embodiments of the composite seal 12 generally have an annular geometry or ring shape that extends between the inner tube 14 and the outer tube 16 to block fluid passage between these tubes 14 and 16. The illustrated composite seal 12 includes a combination of a metal outer shell disposed about an elastic or resilient core material, such as an elastomer. The metal outer shell generally provides resistance to chemical attack by the corrosive well bore fluids, while the elastic material disposed inside the seal 12 provides energization or pressure to force the metal outer shell against one or both of the tubes 14 and 16. Thus, the composite seals 12 described in detail below are particularly well suited for harsh environmental conditions, high pressures, and other undesirable factors that may otherwise degrade the quality and reduce the life of the seal. As a result, the composite seal 12 has the advantages of both metal seals and elastomer seals, as described above, while also eliminating at least some of the drawbacks of each type of seal. For example, the composite seal 12 can be installed with a relatively lower installation force similar to that of elastomer seals, while providing the long-term resistance to well bore fluids typically attributed to metal seals.

Figure 2:
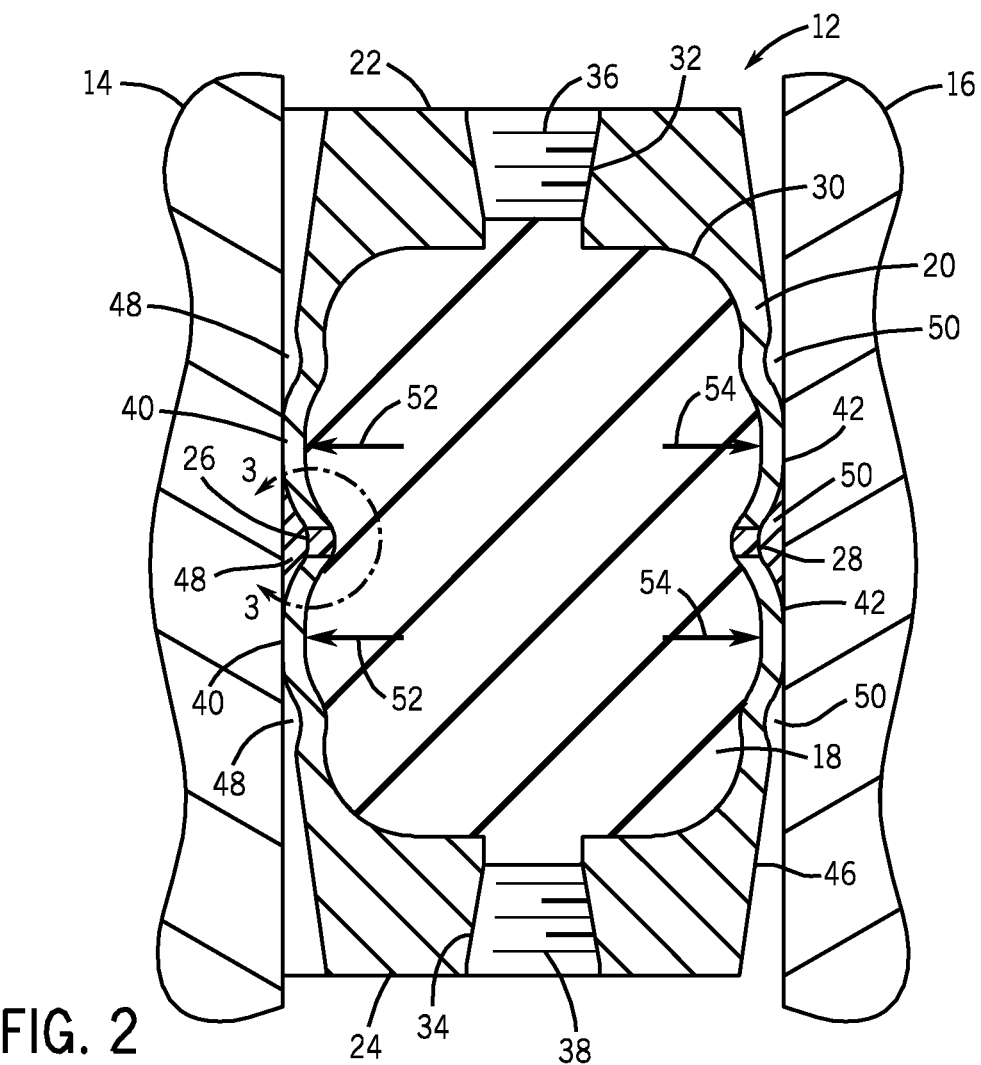
FIG. 2 is a partial cross-sectional view of the system of FIG. 1 taken along line 2-2, further illustrating an embodiment of the composite seal disposed between inner and outer tubes.

FIG. 2 is a partial cross-sectional view of the fluid system 10 of FIG. 1 taken along line 2-2, further illustrating a portion of the annular composite seal 12 disposed between the inner and outer tubes 14 and 16. In the illustrated embodiment, the composite seal 12 includes an elastic material, such as an elastomer 18, disposed completely within a ring-shaped hollow metal shell 20. For example, the elastomer 18 may include a Nitrile elastomer or an elastomer compound, such as Camlast, which is provided by Cameron, Houston, Tex. By further example, the metal shell 20 may be made of stainless steel or nickel-based alloys, such as Inconel. However, the elastomer 18 may include a variety of different types of elastomers, and the metal shell 20 may be made of a variety of different metals in various embodiments. The illustrated shell 20 is formed by coupling an upper shell portion 22 with a lower shell portion 24 along an intermediate joint 26, 28. The illustrated joint 26, 28 is formed by electron beam welding the upper and lower shell portions 22 and 24. After the upper and lower shell portions 22 and 24 are coupled together along the joint 26, 28, the elastomer 18 is injected into an annular interior 30 of the shell 20 through a passage 32 in the upper shell portion 22, a passage 34 in the lower shell portion 24, or a combination thereof. In other words, the illustrated shell 20 is a preformed structure rather than a coating of metal. After filling the shell 20 with the elastomer 18, the passages 32 and 34 are sealed with plugs 36 and 38. The illustrated passages 32 and 34 have threads that receive mating threads disposed on the plugs 36 and 38. In addition, the plugs 36 and 38 may be fixed to the upper and lower shell portions 22 and 24 via welding or another sealing technique. In an alternative embodiment, an upper half of the elastomer 18 is disposed in the upper shell portion 22 and a lower half of the elastomer 18 is disposed in the lower shell portion 24 prior to coupling these shell portions 22 and 24 together along the joint 26, 28. In this alternative embodiment, the passages 32 and 34 and the plugs 36 and 38 can be eliminated from the composite seal 12. In some embodiments, two or more different elastomers (or other elastic material) may be disposed in the metal shell 20, for example, a first elastomer in the upper shell portions 22 and a second different elastomer in the lower shell portion 24. Some embodiments also may include different metallic compositions in different portions of the metal shell 20. For example, the upper shell portion 22 may be made of a first metal and the lower shell portion 24 may be made of a second different metal.

In the illustrated embodiment of FIG. 2, the shell 20 includes a plurality of inner annular ribs 40 and a plurality of outer annular ribs 42 relative to an axis of the composite seal 12. As illustrated, the inner annular ribs 40 directly engage the inner tube 14 to create a metal-on-metal seal between the composite seal 12 and the inner tube 14. Similarly, the outer annular ribs 42 directly contact the outer tube 16 to create a metal-on-metal seal between the composite seal 12 and the outer tube 16. The ribs 40 and 42 can be described as a series of outwardly protruding portions and inwardly protruding portions in a zigzagging pattern one after the other along an inner perimeter 44 and an outer perimeter 46 of the shell 20. Thus, a plurality of annular spaces 48 are disposed between the successive ribs 40, while a plurality of annular spaces 50 are disposed between the successive ribs 42. The energization or pressure of the elastomer 18 disposed within the interior 30 of the shell 20 generally provides an outward force 52 on the ribs 40 and an outward force 54 on the ribs 42. As a result, the ribs 40 and 42 are biased against the tubes 14 and 16, thereby providing a pressurized seal between these tubes 14 and 16. However, the elastomer 18 remains concealed within the shell 20, such that it is not exposed to the harsh environment within the well bore. Instead, the shell 20 serves as the seal interface with the tubes 14 and 16, such that the composite seal 12 can endure the harsh environment of the well bore over a much longer duration of time than the interior elastomer 18 without the shell 20.

Figure 3:
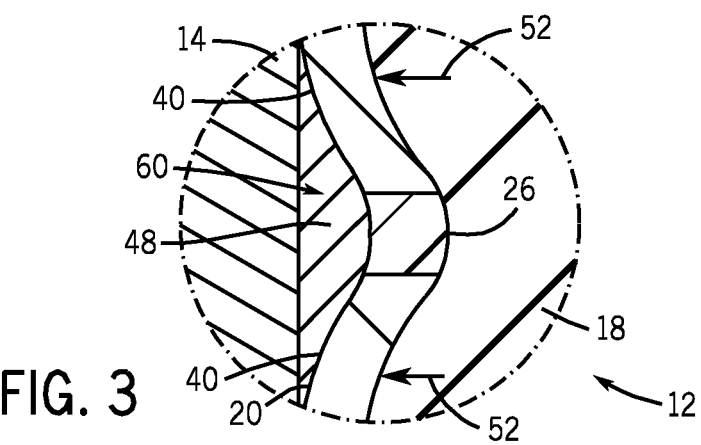
FIG. 3 is a partial cross-sectional view of the composite seal of FIG. 2 taken along line 3-3, further illustrating a thermoplastic ring disposed about the composite seal between the inner and outer tubes.

FIG. 3 is a partial cross-sectional view of the composite seal 12 of FIG. 2 taken along line 3-3, further illustrating the seal interface between the metal shell 20 and the inner tube 14. In the illustrated embodiment, the composite seal 12 further includes a thermoplastic ring 60 disposed along the annular space 48 between the inner annular ribs 40 of the shell 20. Thus, the thermoplastic ring 60 provides a nonmetallic seal interface in-between the metallic seal interfaces provided by the inner annular ribs 40. The thermoplastic ring 60 also provides additional sealing about the welded joint 26 between the upper and lower shell portions 22 and 24. In one exemplary embodiment, the thermoplastic ring 60 is made of a Polyetheretherketones (PEEK) material. Similarly, a thermoplastic ring, such as a PEEK ring, may be disposed in the annular space 50 between the outer annular ribs 32.

Figure 4:
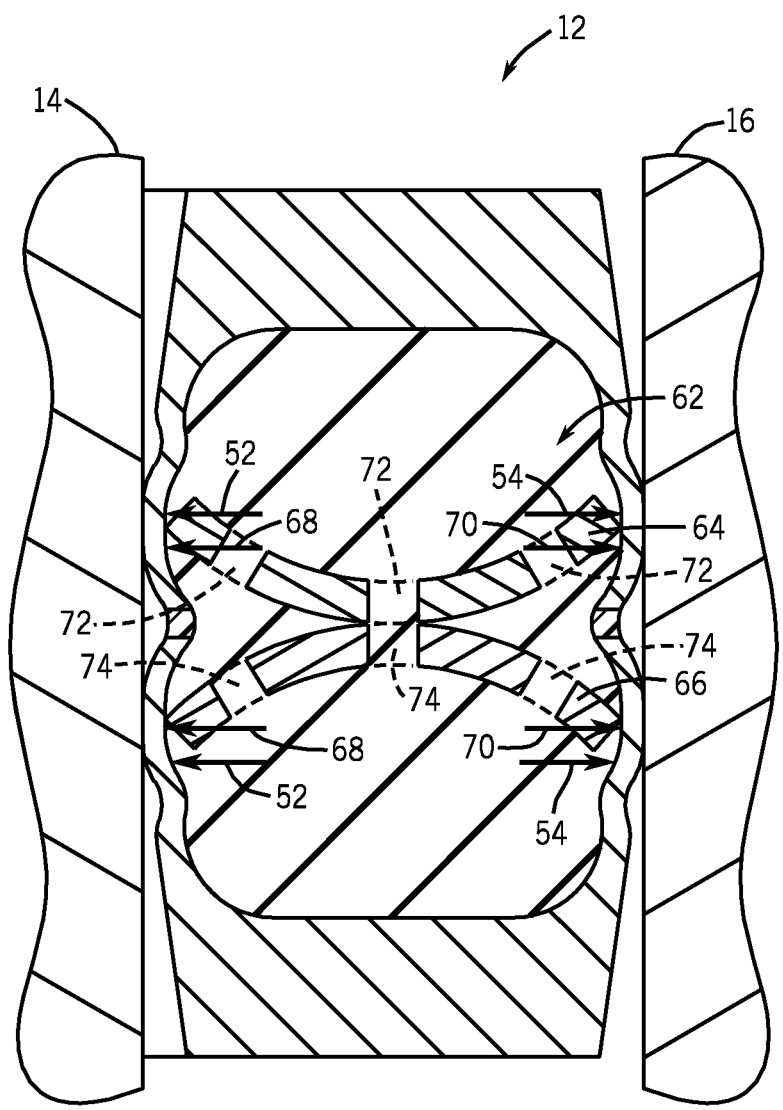
FIG. 4 is a cross-sectional view of an alternative embodiment of the composite seal illustrated in FIGS. 2 and 3, further illustrating a mechanical spring disposed within an interior of the composite seal.

FIG. 4 is a cross-sectional view of another embodiment of the composite seal 12 of FIG. 2, further illustrating a mechanical spring assembly 62 disposed within the annular interior 30 of the metal shell 20 along with the elastomer 18. The illustrated spring assembly 62 includes a pair of opposing ring-shaped springs 64 and 66. Specifically, the springs 64 and 66 have opposing C-shaped cross-sections, which are curved in directions away from one another in a compressed state in-between the inner and outer perimeters 44 and 46 of the shell 20. As a result, the springs 64 and 66 impart an outward pressure or force 68 and 70 toward the ribs 40 and 42, respectively. These forces 68 and 70 supplement the forces 52 and 54 provided by the elastomer 18 within the shell 20. The springs 64 and 66 also include a plurality of openings 72 and 74 to facilitate the filling process of the elastomer 18 within the upper and lower shell portions 22 and 24 of the shell 20. In this exemplary embodiment, the spring 64 along with the upper half of the elastomer 18 is disposed within the upper shell portion 22 and the spring 66 is disposed along with a lower half of the elastomer 18 within the lower shell portion 24 prior to coupling these portions 22 and 24 together along the joint 26, 28. However, other embodiments may include injection passages to enable injection of the elastomer 18 after coupling the upper and lower shell portions 22 and 24 together about the springs 64 and 66, as discussed above with reference to FIG. 2. Again, the springs 64 and 66 provide additional outward force to supplement the force provided by the elastomer 18, thereby increasing the sealing force of the metal shell 20 against both the inner tube 14 and the outer tube 16. This combined force is particularly advantageous in high pressure fluid systems.

FIGS. 5, 6, 7, and 8 are cross-sections of alternative embodiments of the composite seal 12 as illustrated in FIGS. 2, 3, and 4. In each of these alternative embodiments, the composite seal 12 includes a hollow metal ring 80 disposed completely about an elastomer core 82. Specifically, the metal ring 80 has a top cap portion 84, a bottom cap portion 86, and a pair of opposite intermediate seal portions 88 extending between the portions 84 and 86. As illustrated, the elastomer core 82 is disposed completely throughout an interior 90 of the metal ring 80, while the metal ring 80 completely surrounds and protects the elastomer core 82. As a result, the intermediate seal portions 88 of the metal ring 80 provide a metal-on-metal seal interface between the composite seal 12 and corresponding inner and outer metal tube in the system 10.

Figure 5:
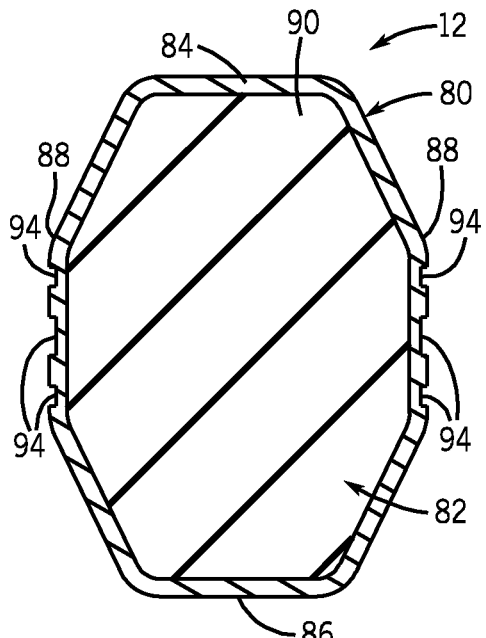
FIGS. 5, 6, 7, and 8 are cross-sectional views of further alternative embodiments of the composite seal of FIGS. 2, 3, and 4.

In the embodiment of FIG. 5, the intermediate seal portions 88 include a plurality of annular grooves 94. In contrast, in the embodiment of FIG. 6, the intermediate seal portions 88 have a plurality of annular ribs 96 disposed about an annular space 98, wherein each of the annular ribs 96 includes a plurality of annular grooves 100. The illustrated metal ring 80 of FIG. 6 also includes annular recesses 106 and 108 disposed in the cap portions 84 and 86, respectively.

Figure 6:
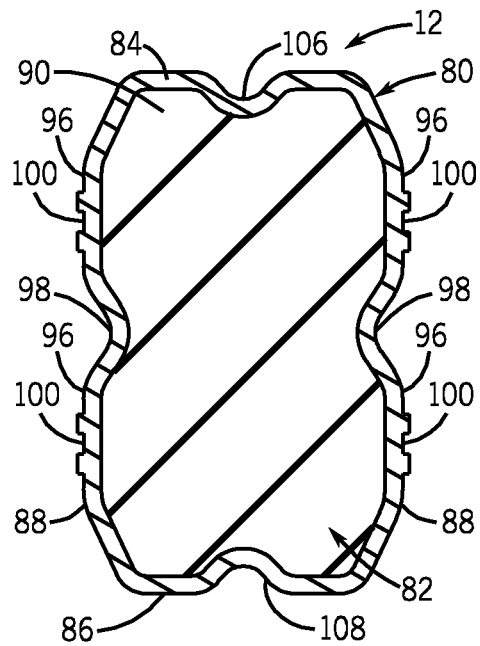
Figure 7:
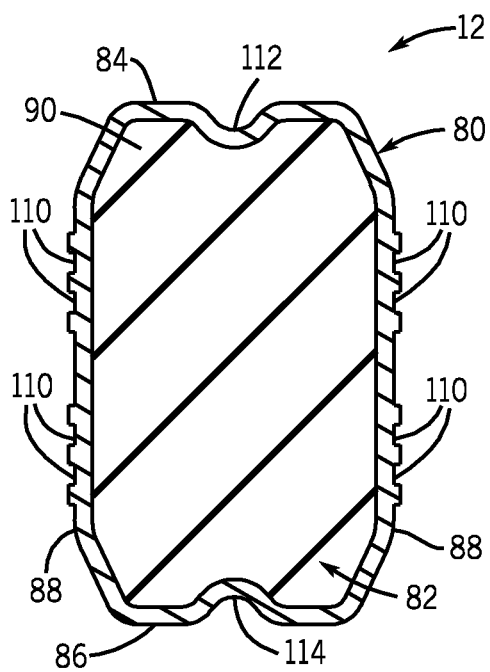

The embodiment of FIG. 7 has features similar to those of both FIGS. 5 and 6. For example, the illustrated metal ring 80 of FIG. 7 includes a plurality of annular grooves 110 disposed along the intermediate seal portions 88. However, in contrast to the embodiment of FIG. 5, the annular grooves 110 of FIG. 7 extend along a longer straight annular surface of the intermediate seal portions 88. In addition, the cap portions 84 and 86 include annular recesses 112 and 114, respectively.

Figure 8:
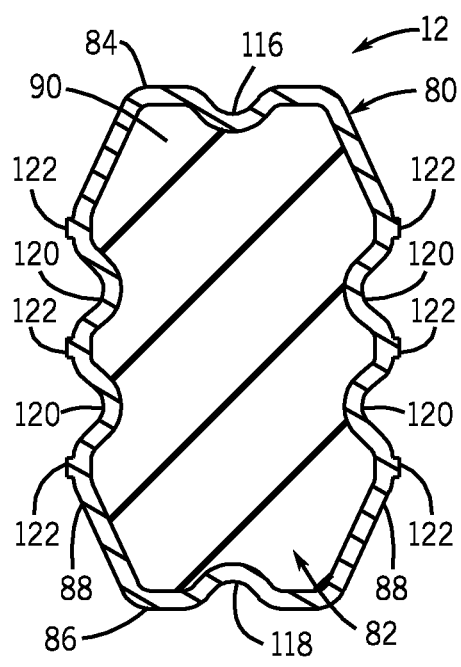

Turning to FIG. 8, this embodiment is similar to FIG. 7, yet the metal ring 80 includes a greater number of recesses and ribs and a greater taper between the cap portions 84 and 96 and the intermediate seal portions 88. The cap portions 84 and 86 of FIG. 8 include annular recesses 116 and 188, respectively. The intermediate seal portions 88 of the metal ring 80 include a plurality of annular spaces 120 and a plurality of annular ribs 122 arranged in an alternating manner one after the other.

Figure 9:
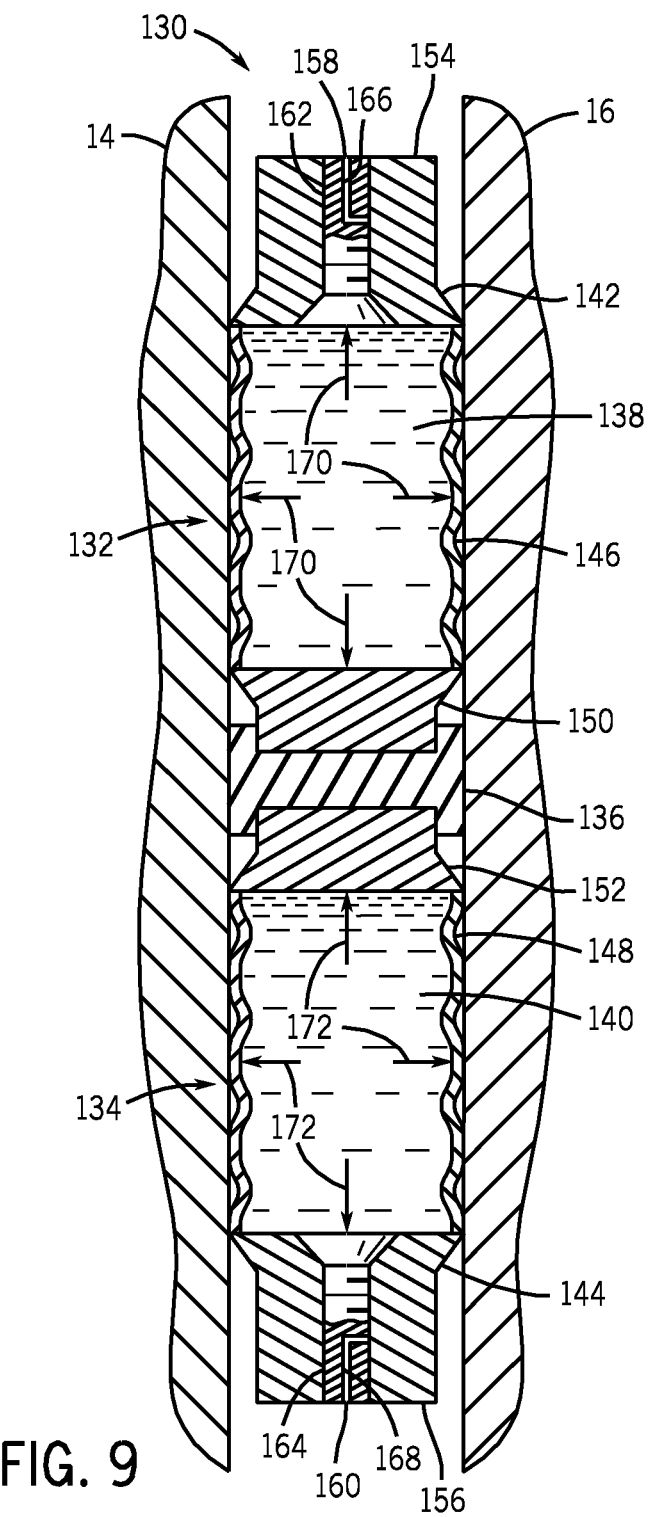
FIG. 9 is a cross-sectional view of an alternative seal for use between the inner and outer tubes of the system of FIG. 1, further illustrating a liquid disposed within a metal bellows.

FIG. 9 is a cross-sectional view of an alternative seal assembly 130 disposed between the inner and outer tubes 14 and 16 of the system 10 of FIG. 1. In the illustrated embodiment, the seal assembly 130 includes a first annular liquid-metal seal 132 and a second annular liquid-metal seal 134 disposed axially about opposite sides of an annular elastomer seal 136 in the space between the inner and outer tubes 14 and 16. Specifically, the first and second seals 132 and 134 include liquids 138 and 140 contained entirely within metal enclosures 142 and 144, respectively. The metal enclosures 142 and 144 have metal bellows 146 and 148 disposed between inner end caps 150 and 152 and outer end caps 154 and 156, respectively. The outer end caps 154 and 156 also include plugs 158 and 160 disposed in respective passages 162 and 164. The illustrated seals 132 and 134 are assembled by welding the bellows 146 and 148 to their respective end caps 150, 152, 154, and 156. Subsequently, the liquids 138 and 140 are injected into the metal bellows 146 and 148 through the passages 162 and 164. Finally, the plugs 158 and 160 are threaded into the passages 162 and 164 to seal off the end caps 154 and 156.

In the illustrated embodiment, the plugs 158 and 160 are partially threaded into the passages 162 and 164, such that fill passages 166 and 168 within the plugs 158 and 160 enable the liquid 138 and 140 to flow into the interior of the bellows 146 and 148. After completely filling the bellows 146 and 148, the plugs 158 and 160 are threaded completely into the end caps 154 and 156 via a tool on the exterior. At this point, the plugs 158 and 160 are welded onto the passages 162 and 164, and the fill passages 166 and 168 are welded shut.

Similar to the embodiments of FIGS. 2-8, the metal enclosures 142 and 144 provide a metal-on-metal seal interface between the seals 132 and 134 and the surrounding tubes 14 and 16. In addition, the liquids 138 and 140 disposed inside the seals 132 and 134 provide an outward force or pressure as indicated by arrows 170 and 172. This pressure or force 170 and 172 causes the metal bellows 146 and 148 to be biased against the inner and outer tubes 14 and 16, thereby improving the seal interface of the seals 132 and 134 with the tubes 14 and 16. In addition, the annular elastomer seal 136 provides an elastomer metal seal interface with both the inner and outer tubes 14 and 16. Referring generally to FIGS. 2-9, the embodiments of FIGS. 2-4 contrastingly use an elastomer or a solid elastic material, rather than a liquid as used in the embodiment of FIG. 9. However, an elastomer or solid elastic material also can be used in the embodiment of FIG. 9.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
  a composite seal, comprising:

a pre-formed annular metal shell comprising a top, a bottom, and a seal interface disposed between the top and the bottom, wherein the pre-formed annular metal shell comprises upper and lower shell portions coupled together at an intermediate joint; and an elastomer disposed within the pre-formed annular metal shell, wherein the elastomer is configured to impart pressure against the seal interface.

2. The system of claim 1, wherein the elastomer is completely contained and sealed within the pre-formed annular metal shell.

3. The system of claim 1, wherein the pre-formed annular metal shell is a preformed hollow metal ring configured to receive the elastomer.

4. The system of claim 1, wherein the pre-formed annular metal shell comprises an elastomer injection passage.

5. The system of claim 4, wherein the elastomer injection passage is sealed by a plug.

6. The system of claim 1, wherein the seal interface comprises a plurality of annular ribs in the pre-formed annular metal shell.

7. The system of claim 1, comprising a thermoplastic ring disposed between the plurality of annular ribs.

8. The system of claim 7, wherein the thermoplastic ring comprises a PEEK material.

9. The system of claim 1, comprising a spring disposed within the pre-formed annular metal shell along with the elastomer.

10. The system of claim 1, comprising one or more tubular members having the composite seal.

11. The system of claim 1, comprising a wellhead having the composite seal.

12. A system, comprising:
a composite seal, comprising:
a metal seal interface;
an elastomer coupled to the metal seal interface;
a spring disposed in the elastomer, wherein the spring and the elastomer cooperatively provide a sealing force against the metal seal interface without application of pressure to an outer perimeter of the metal seal interface.

13. The system of claim 12, wherein the elastomer is completely contained and sealed within a hollow metal seal having the metal seal interface.

14. The system of claim 13, wherein the hollow metal seal comprises a preformed hollow annular enclosure.

15. The system of claim 14, wherein the spring comprises an annular spring.

16. The system of claim 12, wherein the spring comprises a C-shaped cross section.

17. The system of claim 12, comprising a thermoplastic seal disposed along a recess in the metal seal interface.

18. The system of claim 12, wherein the metal seal interface comprises a plurality of ribs and adjacent recesses.

19. A method, comprising:
forming a hollow metal ring having a metal seal interface; and filling the hollow metal ring with an elastomer after forming the hollow metal ring having the metal seal interface; and sealing the hollow metal ring about the elastomer.

20. A system, comprising:
a composite seal, comprising:
a pre-formed annular metal shell comprising a top, a bottom, and a seal interface disposed between the top and the bottom, wherein the pre-formed annular metal shell comprises an elastomer injection passage, and the elastomer injection passage is sealed by a plug; and an elastomer disposed within the pre-formed annular metal shell, wherein the elastomer is configured to impart pressure against the seal interface.

* * * * *